(12) United States Patent
Fotheringham et al.

(10) Patent No.: US 7,174,746 B2
(45) Date of Patent: Feb. 13, 2007

(54) METHOD AND APPARATUS FOR CERAMIZING THE STARTING GLASS OF GLASS-CERAMICS

(75) Inventors: Ulrich Fotheringham, Wiesbaden (DE); Hauke Esemann, Worrstadt (DE); Bernd Hoppe, Ingelheim (DE); Rudiger Sprengard, Mainz (DE); Michael Kluge, Offenbach (DE); Falk Gabel, Mainz (DE)

(73) Assignee: Schott AG, Mainz (DE)

( * ) Notice: Subject to any disclaimer, the term of this patent is extended or adjusted under 35 U.S.C. 154(b) by 68 days.

(21) Appl. No.: 10/935,380

(22) Filed: Nov. 26, 2004

(65) Prior Publication Data

US 2005/0103056 A1 May 19, 2005

Related U.S. Application Data

(62) Division of application No. 09/938,072, filed on Aug. 23, 2001, now Pat. No. 6,843,073.

(30) Foreign Application Priority Data

Sep. 22, 2000 (DE) ................................ 100 60 987

(51) Int. Cl.
 *C03B 32/02* (2006.01)
 *C03C 25/62* (2006.01)

(52) U.S. Cl. .................... 65/355; 65/374.1; 65/374.13; 65/162; 219/411; 373/40; 392/416; 392/420

(58) Field of Classification Search ................ 65/29.1, 65/29.11, 29.12, 29.18, 29.19, 29.21, 33.1, 65/33.2, 63, 162, 355, 356, DIG. 13, 30.1, 65/30.11, 32.1, 32.3, 158, DIG. 4, 374.13; 264/430–434; 501/2–4, 13, 904; 219/405, 219/411, 553; 148/DIG. 80; 373/27–32; 392/422–431

See application file for complete search history.

(56) References Cited

U.S. PATENT DOCUMENTS 3,059,086 A * 10/1962 Pedersen .................... 392/416

(Continued)

FOREIGN PATENT DOCUMENTS

| DE | 29905385 U1 | 8/2000 |
| DE | 19920368 A1 | 10/2000 |
| GB | 1 383 201 | 2/1975 |

OTHER PUBLICATIONS

Office Action from German Patent Office dated Jun. 25, 2001 in German Application No. 100 60 987.2 and English language translation of the same.

*Primary Examiner*—Eric Hug
(74) *Attorney, Agent, or Firm*—Baker & Daniels LLP

(57) ABSTRACT

The invention relates to a method for ceramizing starting glass of glass-ceramics into glass-ceramics, comprising at least the following steps:

1.1 the starting glass is heated from an initial temperature $T_1$ to a temperature $T_2$ which is disposed above the glass transformation temperature $T_G$ at which crystallization nuclei are precipitated;

1.2 the glass is held at the temperature $T_2$ for a period $t_2$ for the precipitation of crystallization nuclei;

1.3 the glass is further heated to a temperature $T_3$ at which a crystal phase grows on the nuclei formed following step 1.1 and 1.2;

1.4 the glass is held for period $t_3$ at a temperature $T_3$ or heated during this period to a higher temperature $T_4$ until the predetermined properties of the glass-ceramics have been reached;

1.5 the control of the temperature curve is performed with the help of a control loop comprising at least one temperature sensor for sensing the temperature and a heating unit as an actuator.

The invention is characterized in that 1.6 the heating unit comprises IR radiators for heating the glass to be relaxed with a thermal dead time of less than 10 secs., especially <5 secs.

7 Claims, 2 Drawing Sheets

U.S. PATENT DOCUMENTS

| | | | |
|---|---|---|---|
| 3,120,433 A | 2/1964 | Van Zee | 65/43 |
| 3,615,317 A | 10/1971 | Jogodzinski | 65/30 |
| 3,620,706 A | 11/1971 | Spanoudis | 65/114 |
| 3,809,543 A | 5/1974 | Gaskell et al. | 65/33 |
| 4,041,278 A * | 8/1977 | Boah | 219/411 |
| 4,188,519 A * | 2/1980 | Berg | 219/601 |
| 4,208,573 A | 6/1980 | Risse | 219/411 |
| 4,789,771 A * | 12/1988 | Robinson et al. | 219/405 |
| 5,551,670 A * | 9/1996 | Heath et al. | 266/87 |
| 5,588,979 A | 12/1996 | Miyazaki et al. | 65/654 |
| 6,259,066 B1 * | 7/2001 | Touchais-Papet et al. | 219/411 |
| 6,513,347 B1 | 2/2003 | Deschamps et al. | 65/29.1 |

* cited by examiner

METHOD AND APPARATUS FOR CERAMIZING THE STARTING GLASS OF GLASS-CERAMICS

This application is a divisional of prior application Ser. No. 09/938,072, now U.S. Pat. No. 6,843,073, filed Aug. 23, 2001.

The invention relates to a method for ceramizing a starting glass of glass-ceramics, a so-called green glass for glass-ceramics, as well as to an apparatus for this purpose.

From UK 1 383 201 a method is known for producing glass-ceramics which substantially comprises the following steps:

A melt of the desired composition is produced at first which may comprise a mixture of $SiO_2$, $Al_2O_3$, and $Li_2O$ with the addition of $TiO_2$ or $ZrO_2$. Thereafter said melt is rapidly cooled to room temperature under avoidance of the precipitation of crystallites or their precursors and thus the starting glass is obtained.

The starting glass is thereafter heated to a temperature in the nucleation range above the glass transformation temperature $T_G$. The temperature range is designated as nucleation range in which the precipitation of the nuclei of crystallization occurs, with the number of nuclei depending on the chosen temperature and the chosen residence time at this temperature. In UK 1 383 201 the nuclei are produced in a heterogeneous way by the precipitation of $TiO_2$ or $ZrO_2$.

Thereafter the green glass modified by the formation of nuclei is further heated to a temperature in the crystallization range. The temperature range is designated as crystallization range in which an epitaxial growth of a crystal phase occurs on the aforementioned nuclei. Although the formation of said crystals generally occurs to a substantial extent already during the heating to said temperature, the residence time at this temperature still has a substantial influence on the properties of the originating glass-ceramics. In the example according to UK 1 383 201 the crystal phase concerns β-eucryptite $LiAlSiO_4$.

In a modification of the aforementioned method, the formation of nuclei can be moved completely to a heating-up ramp, so that there is no residence at a certain temperature in the nuclei formation range. In a further modification it is possible to provide between the residence at a temperature in the nuclei formation range and the residence at a certain temperature in the crystallization range a further residence at a certain interposed temperature.

The preferred control of the method is in two stages. At first, a temperature in the nuclei formation range which is assumed to be disposed between the glass transformation temperature $T_G$ and $T_G+220$ K is set for the duration of 2 to 30 minutes and is thereafter heated with a temperature disposed between 30 K/min and 480 K/min to a temperature between 800° C. and 1250° C. assumed to be disposed in the assumed crystallization range.

In order to allow the implementation of the method as known from UK 1 383 201, it proposes the storing on a non-wettable carrier which comprises a high thermal conductivity, namely a tin bath. Although the apparatus known from UK 1 383 201 allows a rapid supply of the required thermal output, it has disadvantages concerning the rapid and precise positioning control/regulation of the temperature guidance.

As a result, one disadvantage of the method known from UK 1 383 201 is that the implementation of the temperature guidance according to the invention requires the rapid and precise setting of a rapidly changing temperature on the glass; this is not possible in the case of bedding on a tin bath, irrespective of whether this is in static or uninterrupted operation.

The precise setting of the temperature is mandatory for the formation of nuclei. It is known from H. Scholze, "Glas" (Glass), $2^{nd}$ edition, 1977, Springer Verlag, p. 55, that the formation of nuclei is highly temperature-dependent and typically has an approx. 10 K wide maximum for the systems offered as examples, which is the difference of the temperature above the maximum temperature at which the nuclei formation rate has already decreased to 90% of the maximum value and the temperature below the maximum temperature at which the nuclei formation rate has just reached 90% of the maximum value. A precise setting of the temperature is also necessary in view of the viscosity prevailing in the crystallization range, since the viscosity of glasses and glass-ceramics is highly temperature-dependent.

The rapid adjustment of changing temperatures in static operation is counteracted by the thermal capacity of the tin bath which drives up the thermal mass of the overall system and thus the dead time of the temperature regulating process. The rapid change of temperature in uninterrupted operation is counteracted by the favorable thermal conductivity of the tin bath which compensates temperature changes between adjacent zones.

The disadvantage in the described method is further, in the case of an application for producing cooking surfaces made of glass-ceramics, that they usually comprise knobs on the lower side of the glass-ceramic plates for reasons of protection against breaking. These knobs are usually produced by a pressing process after the melting. Such pre-structured plates can only be placed with difficulty on the tin bath, because bubbles may adhere to the knobs which could lead to non-homogeneities in the heat transmission between tin bath and glass.

It is the object of the present invention to provide an improved method for the ceramization of starting glasses for glass-ceramics as compared with such as described in the state of the art and an apparatus for this purpose.

In accordance with the invention, the rapid and precise setting both of the nuclei formation temperature and the temperature curve during the following steep heating ramp during the transition from the formation of nuclei to crystallization and the temperature curves up to the nuclei formation temperature and after reaching the crystallization temperature is performed by control loops of low dead time with the output of a heating installation consisting of infra-red radiators as regulated quantity. The mechanical stability of the starting glass and the arising glass-ceramics is ensured by the use of a suitable support plate.

The relevant aspect for a rapid drive or adjustment of the desired temperatures is the low thermal dead time of the system. In a simplified way, the system for determining the dead time can be regarded as an RC module in electrical engineering (cf. Kohlrausch, "Praktische Physik" (Practical Physics), Teubner Verlag, 1996, Vol. 1, p. 600), with the voltage corresponding in the present case to the temperatures and the current to the thermal flows.

The thermal resistance R is obtained as the quotient from the temperature difference between the heating elements and the material to be baked on the one hand and the flowing heat flow on the other hand. The thermal capacity C is obtained when the heat flow as transmitted by the heating elements is divided by the heating rate of the material to be baked. In the ideal case, i.e. when the flowing thermal flow is supplied exclusively to the material to be baked and there is no heating of scattering capacities, the thermal capacity is that of the glass or the material to be baked alone. If scattering capacities are co-heated, they are weighted to such a high extent as corresponds to the quotient from the own heating rate and the heating rate of the material to be baked.

The thermal resistance R can be provided with a low value by choosing high-temperature infrared radiators as heating elements in accordance with the invention. According to the Stefan-Boltzmann law the net heat flux density j between two mutually radiating surfaces is given by $$j = \sigma \cdot \epsilon_1 \cdot \epsilon_2 \cdot (T_1^4 - T_2^4)/(\epsilon_1 + \epsilon_2 - \epsilon_1 \epsilon_2)$$

with 6 being the Stefan-Boltzmann constant, $\epsilon_1$ or $T_1$ the emissivity or the temperature of the one surface and $\epsilon_2$ or $T_2$ the temperature of the other surface.

In a first approximation the following applies:

$$j = \sigma \cdot \epsilon_1 \cdot \epsilon_2 \cdot 4 \cdot ((T_1+T_2)/2)^3 \cdot (T_1-T_2)/(\epsilon_1+\epsilon_2-\epsilon_1\epsilon_2)$$

The heat flux density is in this approximation proportional to the temperature difference between the two surfaces, with the factor of proportionality not being constant, but depending on its part on the third power of the mean temperature $(T_1+T_2)/2$. According to the above definition for the thermal resistance R, the relationship $J=(T_1-T_2)/R$ applies to the entire rate of heat flow J (with $J=j \cdot A$, with A being the size of the two surfaces). From the approximation relationship for j the proportionality $R \sim 1/((T_1+T_2)/2)^3$ is taken, i.e. the heat resistance R decreases with the third power of the mean temperature.

It follows from the above discussion that one can keep the thermal resistance and thus the dead time of the system particularly low by choosing heating elements of a particularly high temperature. This leads to high mean temperatures and thus a low thermal resistance. Particularly advantageous is therefore the use of short-wave infrared radiators as can be realized by tungsten filaments in a tightly enclosed quartz glass tube with a halogen compound as a protective inert gas, with temperatures of up to approx. 3,000° C. In order to compensate the effect that with rising heating temperature the spectral distribution of the thermal radiation migrates towards the shorter wavelengths, whereby the material to be baked absorbs less radiation at such shorter wavelengths than at longer wavelengths, it is preferably provided that the IR radiation is performed in a radiation cavity in which the infrared radiation is reflected back and forth several times under different angles. Concerning the IR heating in a radiation cavity, reference is hereby made to DE-U-299 05 385 whose disclosure is hereby fully integrated in the present application.

A minimization of the influence of the scattering capacities can be produced by keeping low the thermal capacities belonging to the scattering capacities or suppresses the coupling of the scattering capacities to the infrared radiation to the highest possible extent. This can be achieved in such a way that the emissivity of the furnace walls is kept as small as possible, i.e. they are provided with a strongly reflective arrangement.

Preferably, the share of the infrared radiation reflected and/or scattered from the wall surfaces of the IR radiation cavity is more than 50% of the radiation impinging on said surfaces.

It is particularly advantageous when the share of the infrared radiation reflected and/or scattered from the wall surfaces is more than 90%, preferably more than 98%.

A particular advantage of using an IR radiation cavity is furthermore that the use of highly reflective wall materials concerns a resonator of high quality Q which only has low losses and therefore ensures high energy utilization.

One or several of the following materials can be used as materials for reflecting the IR radiation:
$Al_2O_3$; $BaF_2$; $BaTiO_3$; $CaF_2$; $CaTiO_3$; $MgO.3,5\ Al_2O_3$; $MgO$; $SrF_2$; $SiO_2$; $SrTiO_3$; $TiO_2$; spinel; cordierite; cordierite sintered glass ceramics.

The invention is now explained in closer detail in embodiments shown by way of example by reference to the enclosed drawings, wherein.

Figure 1:
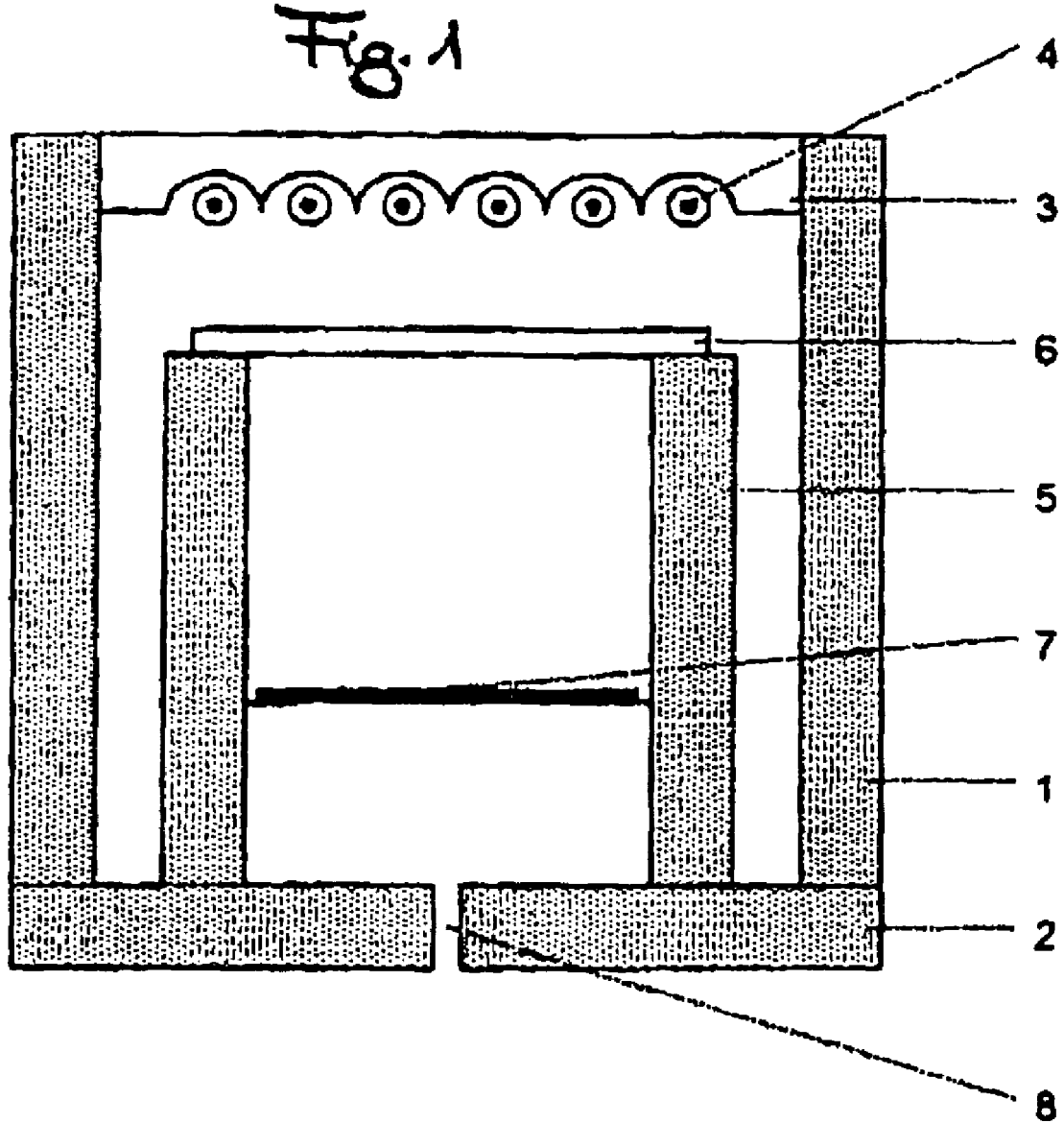
FIG. 1 shows the arrangement by way of example of an apparatus for ceramizing a starting glass of glass-ceramics according to the invention with a radiation cavity.

The apparatus shown in FIG. 1 comprises an IR radiation cavity made of quarzal, consisting of walls 1 and a base plate 2, and whose ceiling is formed by a water-cooled gold-plated reflector 3, below which are disposed six IR radiators 4. This radiation cavity comprises a base area of 245 mm·172 mm and a height of 200 mm. The power density of the IR radiators is max. 600 kW/m² at a color temperature of 3,000 K.

A cylinder 5 which is also made of quarzal is disposed within the radiation cavity, with the inner diameter being 120 mm, the outer diameter being 170 mm and the height 160 mm. Said cylinder is covered with a plate of 6 mm thickness made of synthetic quartz glass 6 which acts as a filter for the long-wave radiation as emitted by the IR radiators.

The glass 7 to be ceramized is a round disk of 4 mm thickness of a typical starting glass of LAS glass-ceramics with a diameter of 118 mm. It is disposed at a height of 60 mm above the floor of the radiation cavity, fixed by magnesium oxide rods.

The IR radiators are driven by thyristor regulators. A Eurotherm PC3000 system is used for regulation. The temperature measurement is performed by means of a 5µ pyrometer through a hole 8 in the base plate.

Figure 2:
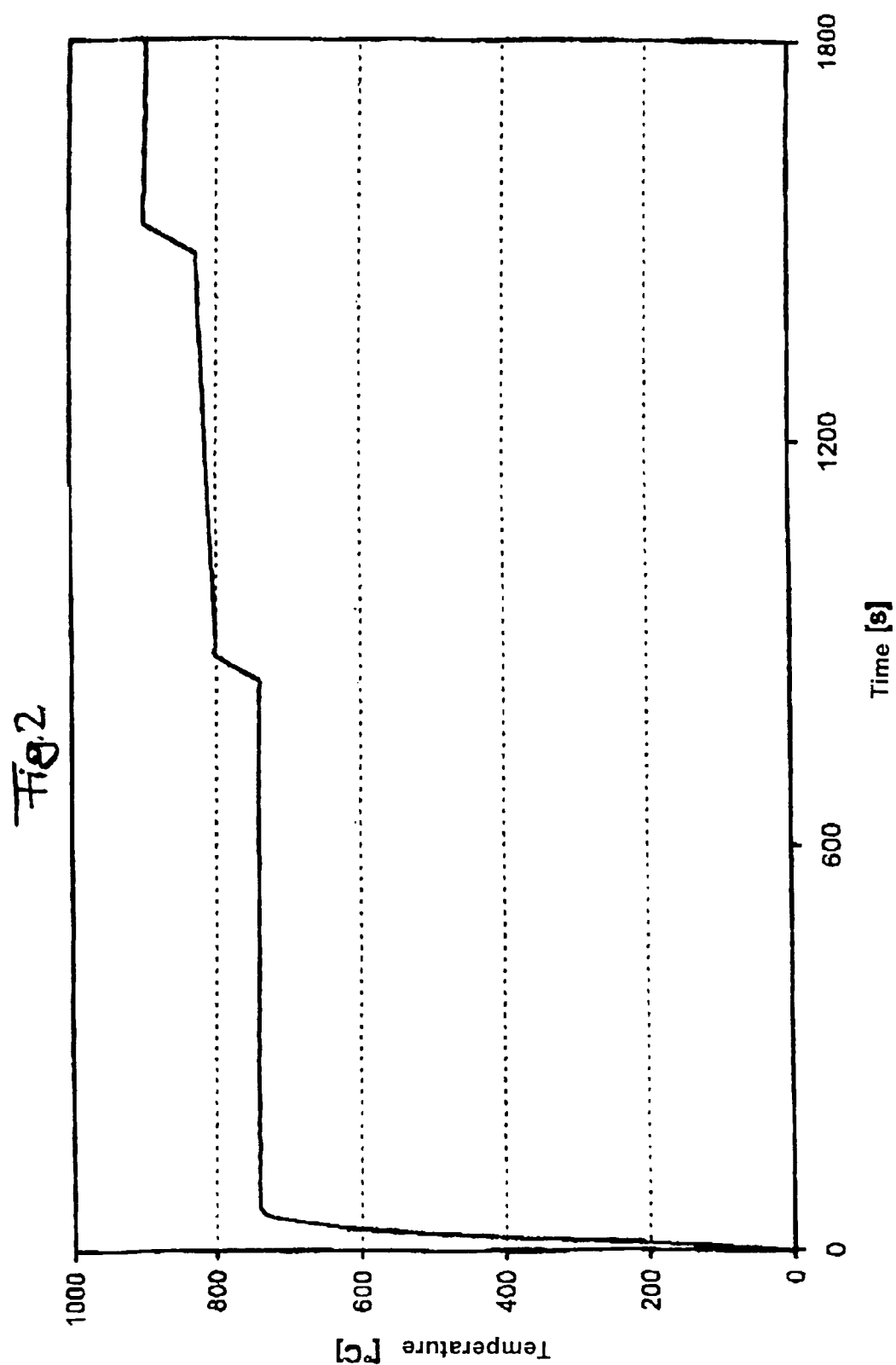
FIG. 2 shows a temperature curve by way of example for a ceramization in accordance with the invention of the starting glass of glass-ceramics.

The ceramization of the glass 7 is performed by heating by means of radiation through the IR radiator, e.g. according to the temperature curve as shown in FIG. 2. As is clearly shown in FIG. 2, when using the method in accordance with the invention, the entire ceramization process is completed within half an hour for example.

In order to prove the success of the performed temperature treatment, it is possible for example to determine the thermal coefficient of expansion for the obtained glass-ceramics. For the illustrated example a mean coefficient of expansion of $-0.03 \cdot 10^{-6} K^{-1}$ was determined in the temperature range of 20 to 700° C., which corresponds to the typical value of commercially obtainable LAS glass-ceramics.

What is claimed is:
1. An apparatus for ceramizing a green glass, comprising:
a heating unit;
a temperature sensor;
a closed-loop/open-loop control device for controlling the heating unit depending on the detected temperature and a predetermined temperature program, wherein the heating unit comprises IR radiators for heating the glass to be relaxed with a thermal dead time of less than 10 secs, and wherein the IR radiators are short-wave IR radiators with a color temperature of more than 2,400° C.

2. An apparatus as claimed in claim 1, wherein the IR radiators are short-wave IR radiators with a color temperature of more than 2,700° C.

3. An apparatus as claimed in claim 1, wherein the IR radiators of the heating unit comprise in a bordered space in a comprehensive manner reflective or backscattering boundary surfaces.

4. An apparatus as claimed in claim 3, wherein the reflective or backscattering boundary surfaces comprise one or mixtures of several of the following materials: $Al_2O_3$; $BaF_2$; $BaTiO_3$; $CaF_2$; $CaTiO_3$; $MgO.3.5Al_2O_3$; $MgO$; $SrF_2$; $SiO_2$; $SrTiO3$; $TiO_2$; quarzal; spinel; cordierite; cordierite sintered glass ceramics.

5. An apparatus as claimed in claim 3, wherein the bordered space is an IR radiation cavity.

6. An apparatus as claimed in claim 1, wherein the apparatus comprises devices for storing the starting glass to be ceramized.

7. The apparatus as claimed in claim 1 wherein the heating unit comprises IR radiators for heating the glass to be relaxed with a thermal dead time of less than 5 secs.

* * * * *